Figure 1:
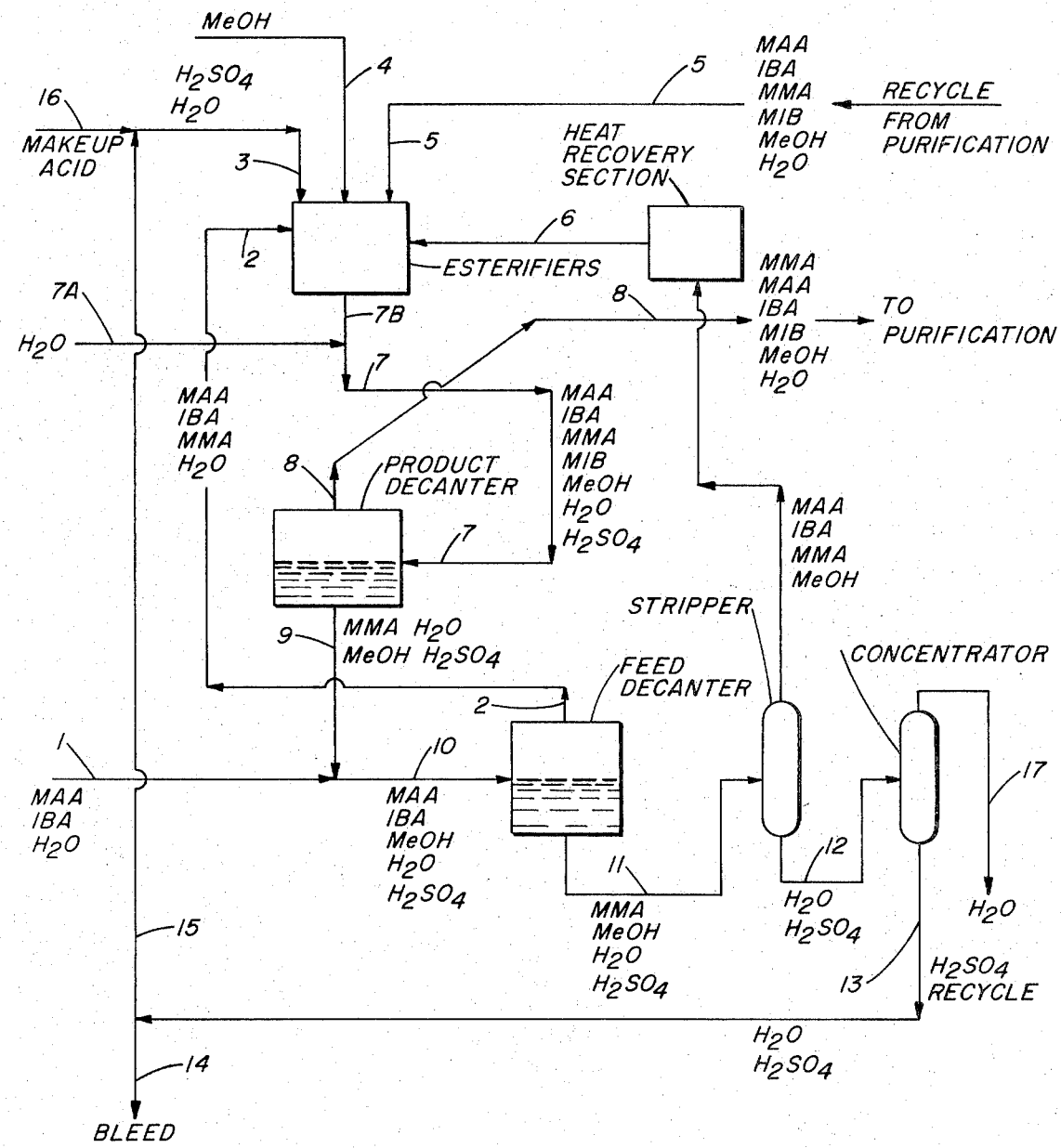

United States Patent [19]
Pai et al.

[11] 3,821,286
[45] June 28, 1974

[54] PROCESS FOR THE PRODUCTION OF METHYL METHACRYLATE

[75] Inventors: Venkatrao Krishnaraya Pai; Daniel Hyman, both of Fairfield, Conn.; John Maurice Witheford, Wycoff, N.J.

[73] Assignee: American Cyanamid Company, Stamford, Conn.

[22] Filed: Oct. 5, 1971

[21] Appl. No.: 186,748

[52] U.S. Cl. ............................................. 260/486 R
[51] Int. Cl. ............................................. C07c 69/54
[58] Field of Search ............................................. 260/486

[56] References Cited
UNITED STATES PATENTS
3,264,347    8/1966    Sennewald et al. ............. 260/486 R
3,539,620    11/1970    Coyne et al. ..................... 260/486 R Primary Examiner—Lorraine A. Weinberger
Assistant Examiner—Paul J. Killos
Attorney, Agent, or Firm—Gordon L. Hart

[57] ABSTRACT

In the esterification of methacrylic acid by reaction with methanol in aqueous solution with sulfuric acid catalyst, the product stream from the esterification reactor is first separated into two immiscible liquid phases, an organic phase containing methyl methacrylate product and an aqueous phase containing the sulfuric acid. The aqueous phase from the first separation is mixed with an aqueous feed stream containing the reactant methacrylic acid. The sulfuric acid causes separation of two immiscible liquid phases consisting of an organic-rich phase containing methacrylic acid which is suitable for feed directly to the esterification reactor and a water-rich phase which contains the sulfuric acid. The water-rich phase is stripped of organics which are recycled and the sulfuric acid residue is concentrated by removing water and recycled to the reactor.

3 Claims, 2 Drawing Figures

3,821,286

PROCESS FOR THE PRODUCTION OF METHYL METHACRYLATE

The invention relates to a continuous process which comprises the esterification of methacrylic acid by reaction with methanol in aqueous solution with sulfuric acid catalyst to make methyl methacrylate. More particularly the invention relates to improvements in the recycling of sulfuric acid recovered from the esterification product mixture. The invention is particularly adaptable to a process of the kind described in which the methacrylic acid to be fed to the esterification reactor is received as a dilute aqueous methacrylic acid solution which needs to be concentrated before it is used in the esterification reaction.

It is known to react methacrylic acid and methanol in aqueous solution with sulfuric acid catalyst to make methyl methacrylate and to separate the reaction product mixture into immiscible aqueous and organic phases as a first step in the product recovery. The aqueous phase from such separation contains practically all of the sulfuric acid which may be recycled to the esterification reactor. In the esterification reactor it is desirable to maintain the concentration of the reactants and acid as high as is practical. It is preferable to maintain a relatively small proportion of water in the reaction mixture in order to increase the reaction rate. Accordingly it may become necessary to remove excess water from one or more of the feed streams before they enter the reactor. The present invention provides a unique combination of steps in which the same sulfuric acid is used, in the course of its recycle, not only as a catalyst for the esterification reaction but also as a salting-out electrolyte for concentrating the methacrylic acid feed stream before such feed stream enters the reactor.

The invention is applied in a continuous process for the manufacture of methyl methacrylate by esterification of methacrylic acid with methanol. The reaction is carried out in liquid state while both reactants are in the presence of aqueous sulfuric acid solution. Preferably the esterification is carried out at about 85° C. which is just below the boiling point of the reaction mixture. Sulfuric acid catalyzes the reaction. From the esterification reactor, the liquid product mixture is cooled and led to a decanter where a two-phase liquid separation occurs. The heavy phase is an aqueous solution containing practically all of the sulfuric acid, most of the water and methanol and lesser amounts of the other organic components. The lighter phase contains most of the methyl methacrylate product, unreacted methacrylic acid and other organic components. It also contains some residual methanol and water. The organic phase is drawn off and led to a purification section for further separation of the product, as by distillation. The amount of methanol and water in the organic phase can be minimized by controlled addition of water to the product decanter, according to known phase-equilibrium data for the methanol-water-methylmethacrylate mixtures. Also, the presence of sulfuric acid makes this phase separation quick and efficient due to the marked density difference between the two phases. When the sulfuric acid phase from the first separation is mixed with an aqueous solution of methacrylic acid, the inorganic acid causes the separation of the methacrylic acid solution into two immiscible liquid phases. This mixture is led to a decanter where a heavy immiscible phase containing practically all of the sulfuric and most of the water is separated from a lighter immiscible phase which contains mostly methacrylic acid and other organics with only a minor amount of water. This light phase is led directly to the esterification reactor and the heavy phase, containing the sulfuric acid, is removed and led to a stripper where it is distilled to remove organics for recycle to the reactor. The organic distillate may be recycled either directly or preferably through a heat recovery system, where the distilled vapors are condensed or partly condensed before recycle. The distillation residue may be further distilled to remove water as necessary to concentrate the acid for recycle to the esterification reactor. The invention will be explained in more detail by reference to certain preferred embodiments and with reference to the drawings.

In the drawings,

FIG. 1 is a schematic flow diagram showing the path of the reactant streams, product streams, recycle streams, etc. to and between the several unit operations involved in a process embodying the invention. The process equipment for the essential unit operations and the auxiliary equipment for heating, cooling, pumping and the like are not illustrated nor described in detail because conventional process and auxiliary equipment can be used for the process as it is described.

Figure 2:
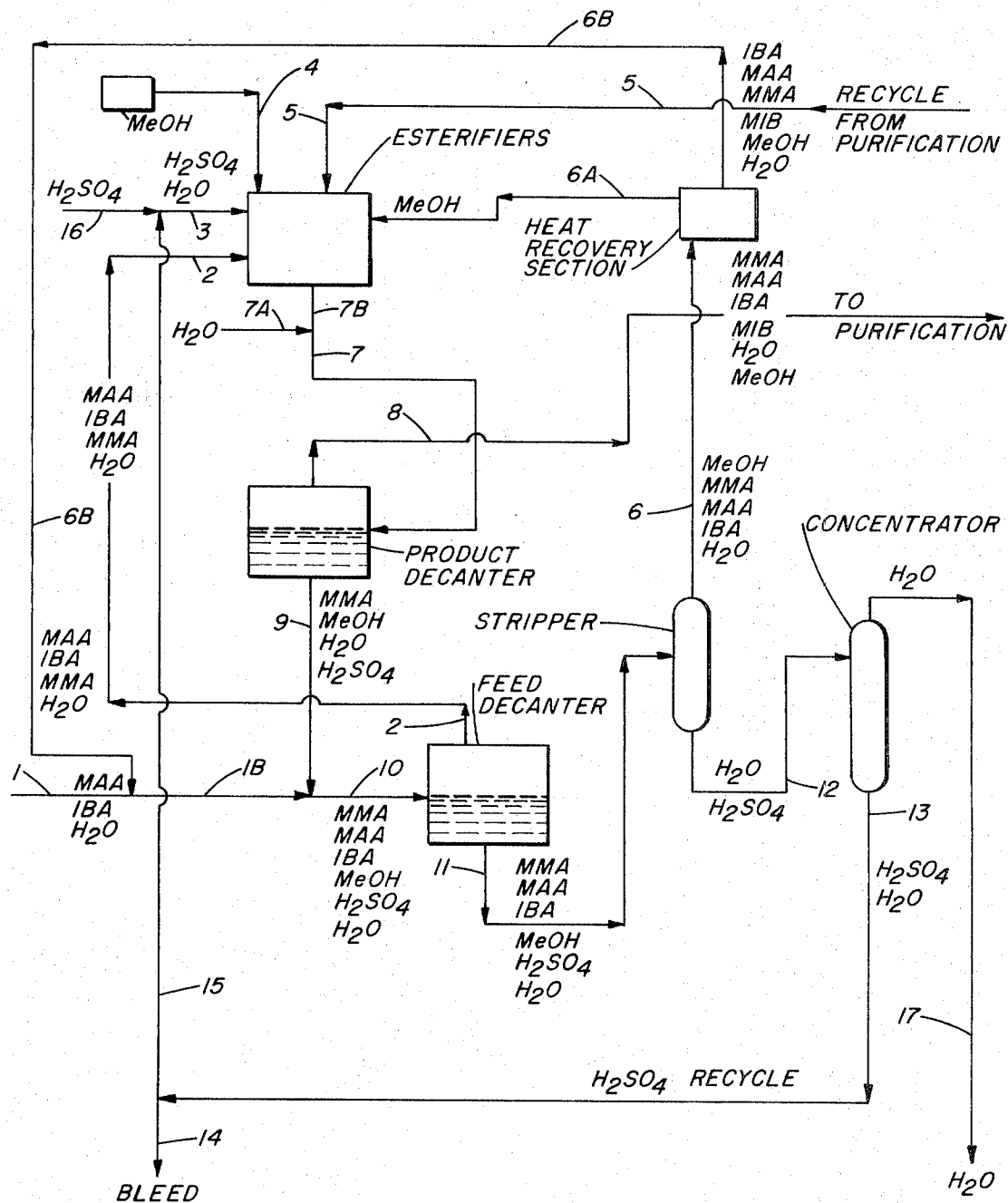

FIG. 2 is a schematic flow diagram illustrating a variation on the process shown in FIG. 1. The invention is embodied in both of the processes illustrated in FIGS. 1 & 2.

Referring now to FIG. 1, the esterification reactor is charged with methacrylic acid reactant through line 2, and with aqueous sulfuric acid through line 3 and with methanol through line 4. A recycle stream 5 leading to the reactor from the purification section contains mostly organics that have been separated from the methyl methacrylate product by distillation (the product purification can be accomplished by conventional rectification and is not described in detail herein). Stream 6 leading to the reactor is a recycle stream of several organics and water which has been separated from the sulfuric acid aqueous recycle, as will be explained in more detail. A single product stream 7 from the esterification reactor leads to a product decanter. In one embodiment the reactor effluent stream 7B is mixed with more water 7A and the mixture 7 is led to the product decanter. In most cases the product stream is cooled, as by a heat exchanger not shown, before it enters the decanter. In the product decanter a separation of two immiscible liquid phases occurs. The light organic phase, which contains most of the methyl methacrylate, is drawn off as stream 8 which is led to a purification section. The heavy aqueous phase containing the sulfuric acid is drawn off as stream 9 and mixed with an incoming stream 1, which contains methacrylic acid in aqueous solution. Isobutyric acid is present as an impurity, in the embodiment illustrated, as is explained elsewhere herein. The mixed stream 10 is directed to a feed decanter where a second separation of two immiscible liquid phases occurs. The light phase, stream 2, which is drawn off and led directly to the reactor, contains methacrylic acid with minor concentration of water. The heavy phase from the feed decanter contains the sulfuric acid and most of the water. This stream 11 is distilled in a stripping column to remove the organics overhead, which are condensed in a heat recovery section and returned as stream 6 to the reactor. When necessary, the aqueous sulfuric acid is then concentrated by removal of water, as by further distillation, to a concentration suitable for return of the sulfuric acid to the reactor. Water distilled from the acid solution is discharged as waste in line 17. Concentrated acid is returned to the reactor by line 15. Some bleed off from the reflux stream through line 14 and some sulfuric acid make up through line 16 may be required and is provided for. A material balance is tabulated in Table 1 for a typical process of the kind illustrated in FIG. 1, in which some water is added to the reactor effluent. Table 2 is a material balance for the same flow scheme except without such addition of water to the reactor effluent. Numbers at the head of the columns in the Tables refer to the numbers of the respective streams as they are described above and by reference numerals in FIG. 1. The abbreviated component descriptions at the left of each line in the table stand for the following:

MAA — methacrylic acid
IBA — isobutyric acid
MMA — methyl methacrylate
MIB — methyl isobutyrate
MeOH — methanol
$H_2O$ — water
$H_2SO_4$ — sulfuric acid The material balances presented in the tables were based on a methacrylic acid feed that contained some isobutyric acid as an impurity. The feed stream 1 is a typical product stream from a process for methacrylic acid synthesis by catalytic dehydrogenation of isobutyric acid, such as the process described in U.S. Pat. Application Ser. No. 818,818, filed Apr. 23, 1969, now abandoned, by Dr. Kin Tsu. The invention is particularly amenable to the use of feed streams of this kind, in which water concentration in the feed stream received is undesirably too high for direct feed to the reactor. The presence of isobutyric acid is incidental and not necessary to the present invention. The process is flexible enough to be used with almost any practical design requirement for the water concentration in the reactor, and several variations using different water concentrations in the reactor are described in the examples herein. Increasing the degree of concentration of the sulfuric acid is one means for reducing the amount of water fed to the reactor. Another means for reducing water feed to the reactor is illustrated in FIG. 2, wherein organics distilled from the aqueous acid recycle stream are partially condensed in the heat-recovery system. A methanol rich vapor stream 6A is separated from the other components and returned directly to the esterifier while the other components are condensed and recycled in stream 6B to the feed decanter. The flow scheme illustrated in FIG. 2 is otherwise essentially the same as that described for FIG. 1, except the respective stream compositions may differ in relative amounts of the respective components. Material balances for two typical schemes illustrated by FIG. 2, are tabulated with water added to stream 7 in Table 3 and without such water added in Table 4.

The material balances and flow schemes described in the foregoing examples are preferred examples embodying the invention. Other processes embodying the invention may be carried out without particular reference to certain details of the above examples which are presented to describe the best mode presently contemplated of carrying out the invention. The subject matter which we regard as our invention is defined by the following claims.

TABLE 1

Material Balance Calculations Based on FIG. 1

|  | 1 gms | 2 gms | 3 gms | 4 gms | 5 gms | 6 gms | 7A gms | 7B gms | 7 gms | 8 gms |
|---|---|---|---|---|---|---|---|---|---|---|
| MAA | 85.14 | 20.0 |  |  | 4.30 | 65.14 |  | 4.30 | 4.30 | 4.30 |
| IBA | 15.0 | 3.53 |  |  | .788 | 11.5 |  | .788 | .788 | .788 |
| MMA |  | 2.55 |  |  | 1.0 | 8.30 |  | 110.85 | 110.85 | 100 |
| MIB |  |  |  |  | 5.20 |  |  | 17.34 | 17.34 | 17.34 |
| MeOH |  |  |  | 31.72 | 3.76 | 97.64 |  | 101.44 | 101.44 | 3.82 |
| $H_2O$ | 233.31 | 4.24 | 107.8 |  | 3.82 | 246.2 | 128.3 | 379.9 | 508.2 | 1.275 |
| $H_2SO_4$ |  |  | 107.8 |  |  |  |  | 107.8 | 107.8 |  |
|  | 333.4 | 30.3 | 215.6 | 31.72 | 18.87 | 428.8 | 128.3 | 722.4 | 850.7 | 127.5 |

|  | 9 gms | 10 gms | 11 gms | 12 gms | 13 gms | 14 gms | 15 gms | 16 gms | 17 gms |
|---|---|---|---|---|---|---|---|---|---|
| MAA |  | 85.14 | 65.14 |  |  |  |  |  |  |
| IBA |  | 15.0 | 11.5 |  |  |  |  |  |  |
| MMA | 10.85 | 10.85 | 8.30 |  |  |  |  |  |  |
| MIB |  |  |  |  |  |  |  |  |  |
| MeOH | 97.64 | 97.64 | 97.64 |  |  |  |  |  |  |
| $H_2O$ | 506.9 | 740.1 | 735.9 | 489.7 | 107.8 | 1.078 | 106.7 | 381.9 |  |
| $H_2SO_4$ | 107.8 | 107.8 | 107.8 | 107.8 | 107.8 | 1.078 | 106.7 | 1.078 |  |
|  | 723.2 | 1057 | 1026.3 | 597.5 | 215.6 | 2.156 | 213.4 | 2.156 | 381.9 |

BASIS: 100 gms of MMA in stream (8)
Assumed: 70% $H_2O$ in organic acid feed (stream (1))
95% conversion of acid to ester
15 wt.% $H_2SO_4$ in feed to esterifier
MeOH/MMA mole ratio in feed to esterifier = 4.0

TABLE 2

Material Balance Calculations Based on FIG. 1
Without the addition of water (stream 7A) to
Esterifier Effluent

|  | 1 gms | 2 gms | 3 gms | 4 gms | 5 gms | 6 gms | 7 gms | 8 gms | 9 gms |
|---|---|---|---|---|---|---|---|---|---|
| MAA | 85.3 | 36.7 |  |  | 4.30 | 48.6 | 4.30 | 4.30 |  |
| IBA | 15.0 | 6.5 |  |  | .788 | 8.5 | .788 | .788 |  |
| MMA |  | 3.6 |  |  | 1.03 | 4.8 | 110.9 | 102.5 | 8.4 |
| MIB |  |  |  |  | 5.20 |  | 17.34 | 17.34 |  |
| MeOH |  |  |  | 31.7 | 4.45 | 96.9 | 101.44 | 4.5 | 96.9 |
| $H_2O$ | 233.3 | 7.6 | 107.8 |  | 4.8 | 184 | 379.9 | 1.6 | 378.3 |
| $H_2SO_4$ |  |  | 107.8 |  |  |  | 107.8 |  | 107.8 |
|  | 333 | 54.4 | 215.6 | 31.7 | 20.6 | 343 | 722.5 | 131.03 | 591.4 |

|  | 10 gms | 11 gms | 12 gms | 13 gms | 14 gms | 15 gms | 16 gms | 17 gms |
|---|---|---|---|---|---|---|---|---|
| MAA | 85.3 | 48.6 |  |  |  |  |  |  |
| IBA | 15.0 | 8.5 |  |  |  |  |  |  |
| MMA | 8.4 | 4.8 |  |  |  |  |  |  |
| MIB |  |  |  |  |  |  |  |  |
| MeOH | 96.9 | 96.9 |  |  |  |  |  |  |
| $H_2O$ | 611.3 | 604 | 420 | 107.8 | 1.078 | 106.7 | 1.078 | 312 |
| $H_2SO_4$ | 107.8 | 107.8 | 107.8 | 107.8 | 1.078 | 106.7 | 1.078 |  |
|  | 925 | 871 | 527.8 | 215.6 | 2.156 | 213.4 | 2.156 | 312 |

BASIS: 102.5 gms MMA in stream ⑧
Assumptions: Same as those given in Table 1

TABLE 3

Material Balance Calculations Based on FIG. 2

|  | 1 gms | 2 gms | 3 gms | 4 gms | 5 gms | 6 gms | 6A gms | 6B gms | 7B gms | 7A gms | 7 gms |
|---|---|---|---|---|---|---|---|---|---|---|---|
| MAA | 85.3 | 85.3 |  |  | 4.30 | 200 |  | 200 | 4.30 |  | 4.30 |
| IBA | 15.0 | 15.0 |  |  | .788 | 35.0 |  | 35.0 | .788 |  | .788 |
| MMA |  | 10.9 |  |  | 1 | 25.4 |  | 25.4 | 110.9 |  | 110.9 |
| MIB |  |  |  |  | 4.96 |  |  |  | 17.34 |  | 17.34 |
| MeOH |  |  |  | 31.7 | 3.76 | 97.6 | 97.6 |  | 101.4 |  | 101.4 |
| $H_2O$ | 233 | 48 | 66 |  | 3.81 | 755 |  | 755 | 135.6 | 414.4 | 550 |
| $H_2SO_4$ |  | 66 |  |  |  |  |  | 66 |  | 66 |  |
|  | 333.3 | 159.2 | 132 | 31.7 | 18.6 | 1113 | 97.6 | 1015 | 436.3 | 414.4 | 850.7 |

|  | 8 gms | 9 gms | 10 gms | 11 gms | 12 gms | 13 gms | 14 gms | 15 gms | 16 gms | 17 gms |
|---|---|---|---|---|---|---|---|---|---|---|
| MAA | 4.30 |  | 285.3 | 200 |  |  |  |  |  |  |
| IBA | .788 |  | 50 | 35.0 |  |  |  |  |  |  |
| MMA | 100 | 10.9 | 36.3 | 25.4 |  |  |  |  |  |  |
| MIB | 17.34 |  |  |  |  |  |  |  |  |  |
| MeOH | 3.8 | 97.6 | 97.6 | 97.6 |  |  |  |  |  |  |
| $H_2O$ | 1.27 | 549 | 1537 | 1489 | 734 | 66 | .66 | 65.34 | .66 | 668 |
| $H_2SO_4$ |  | 66 | 66 | 66 | 66 | 66 | .66 | 65.34 | .66 |  |
|  | 127.5 | 723.5 | 2072 | 1913 | 800 | 132 | 1.32 | 130.7 | 1.32 | 668 |

BASIS: 100 gms of MMA off stream ⑧
Assumptions: Same as those given in Table 1

TABLE 4

Material Balance Calculations Based on FIG. 2
Without the addition of water, to the esterifier effluent, stream 7

|  | 1 gms | 2 gms | 3 gms | 4 gms | 5 gms | 6A gms | 6B gms | 6 gms | 7 gms | 8 gms |
|---|---|---|---|---|---|---|---|---|---|---|
| MAA | 85.3 | 85.3 |  |  | 4.30 |  | 45.9 | 45.9 | 4.30 | 4.30 |
| IBA | 15.0 | 15.0 |  |  | .788 |  | 8.1 | 8.1 | .788 | .788 |
| MMA |  | 17.6 |  |  | .915 |  | 10.4 | 10.4 | 110.9 | 91.5 |
| MIB |  |  |  |  | 4.96 |  |  |  | 17.34 | 17.34 |
| MeOH |  |  |  | 31.74 | 9.2 | 92.1 |  | 92.1 | 101.4 | 9.29 |
| $H_2O$ | 233 | 31.4 | 66 |  | 11.5 |  | 173 | 173 | 135.6 | 3.82 |
| $H_2SO_4$ |  |  | 66 |  |  |  |  |  | 66 |  |
|  | 333.3 | 149.3 | 132 | 31.7 | 31.7 | 92.1 | 237.4 | 329.5 | 436.3 | 127 |

TABLE 4—Continued

Material Balance Calculations Based on FIG. 2
Without the addition of water, to the esterifier effluent, stream 7

|  | 9 gms | 10 gms | 11 gms | 12 gms | 13 gms | 14 gms | 15 gms | 16 gms | 17 gms |
|---|---|---|---|---|---|---|---|---|---|
| MAA |  | 131.2 | 45.9 |  |  |  |  |  |  |
| IBA |  | 23.1 | 8.1 |  |  |  |  |  |  |
| MMA | 19.4 | 29.8 | 10.4 |  |  |  |  |  |  |
| MIB |  |  |  |  |  |  |  |  |  |
| MeOH | 92.1 | 92.1 | 92.1 |  |  |  |  |  |  |
| $H_2O$ | 131.8 | 538 | 507 | 334 | 66 | .66 | 65.34 | .66 | 268 |
| $H_2SO_4$ | 66 | 66 | 66 | 66 | 66 | .66 | 65.34 | .66 |  |
|  | 309.3 | 880.2 | 729.5 | 400 | 132 | 1.32 | 130.7 | 1.32 | 268 |

BASIS: 91.5 gms product MMA in stream ⑧
Assumptions: Same as those given in Table 1

We claim:

1. In a process which comprises esterification of methacrylic acid by reaction with methanol in aqueous solution with sulfuric acid catalyst in an esterification reactor, followed by a first separation of two immiscible liquid phases consisting of an aqueous phase containing sulfuric acid and an organic liquid product phase, followed by concentration of the sulfuric acid and recycling of the sulfuric acid concentrate to the esterification reactor, the improvement which comprises mixing said aqueous phase containing sulfuric acid from said first separation with an aqueous methacrylic acid feed stream thereby causing a second separation of the feed stream into two immiscible liquid phases consisting of an aqueous phase containing sulfuric acid and an immiscible organic phase containing methacrylic acid, directing said methacrylic acid-containing organic phase to the esterification reactor, concentrating the aqueous sulfuric acid phase from said second separation and recycling the concentrated sulfuric acid to the esterification reactor.

2. A process defined by claim 1 wherein said concentrating of the sulfuric acid phase from said second separation comprises distillation of organic components comprising methanol and methacrylic acid from said aqueous sulfuric acid phase and recycling said organic components to the esterification reactor.

3. A process defined by claim 2 wherein the overhead vapors containing said organic components from the defined distillation is partially condensed to separate methanol as vapor and said methanol is recycled directly to the reactor while the condensate containing methacrylic acid and water is recycled to the defined second two-phase separation.

* * * * *

UNITED STATES PATENT OFFICE
CERTIFICATE OF CORRECTION

Patent No. 3,821,286                   Dated June 28, 1974

Inventor(s) VENKATRAO KRISHNARAYA PAI, DANIEL HYMAN AND JOHN MAURICE WITHEFORD

It is certified that error appears in the above-identified patent and that said Letters Patent are hereby corrected as shown below:

Table 1, under $H_2SO_4$ delete "gms" first occurrence.

Table 1, under 17 insert -- gms -- .

Table 3, opposite $H_2SO_4$ under 2 gms delete -- 66 -- .

Table 3, opposite $H_2SO_4$ under 3 gms insert "66" .

Table 3, opposite $H_2SO_4$ under 6B gms delete -- 66 -- .

Table 3, opposite $H_2SO_4$ under 7B gms insert "66" .

Table 3, opposite $H_2SO_4$ under 7A gms delete -- 66 -- .

Table 3, opposite $H_2SO_4$ under 7 gms insert "66" -- .

Signed and sealed this 19th day of November 1974.

(SEAL)
Attest:

McCOY M. GIBSON JR.           C. MARSHALL DANN
Attesting Officer             Commissioner of Patents